Dec. 7, 1954
G. J. PANDAPAS
2,696,570
ELEMENT OF MECHANISM FOR CONDUCTING
ELECTRICITY BETWEEN RELATIVELY
MOVABLE STRUCTURES
Filed May 23, 1951
4 Sheets-Sheet 1
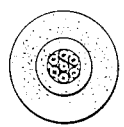
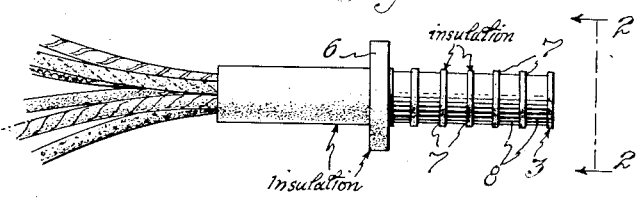
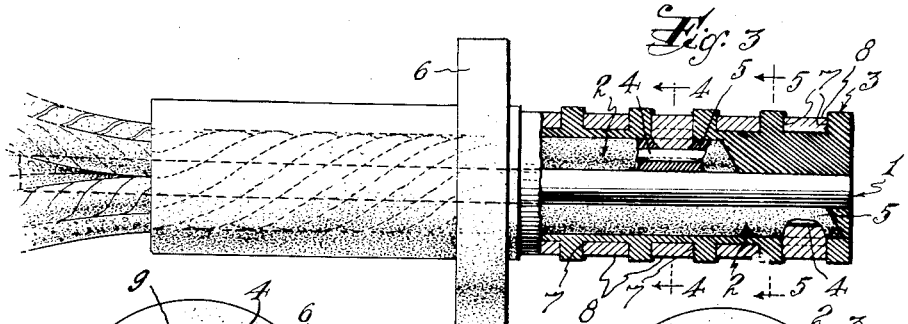
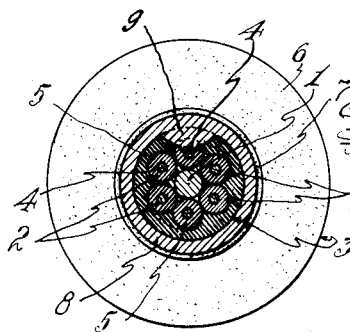
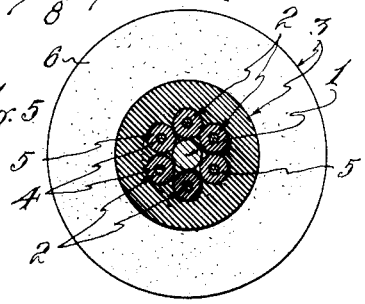
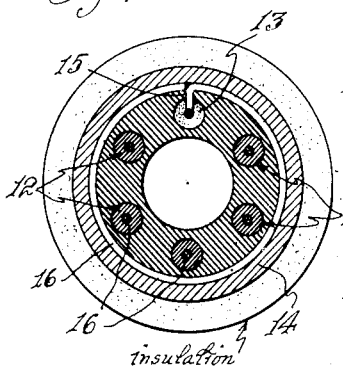
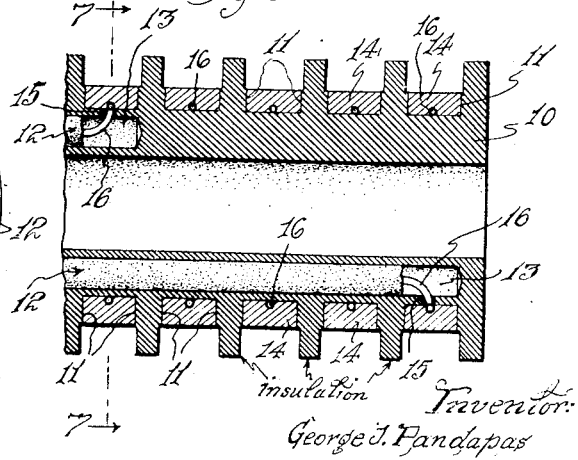
Inventor:
George J. Pandapas
BY
Harry Brook,
Attorney.

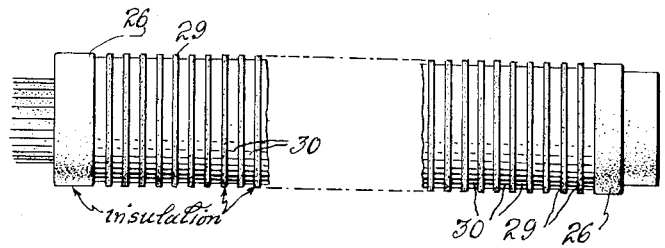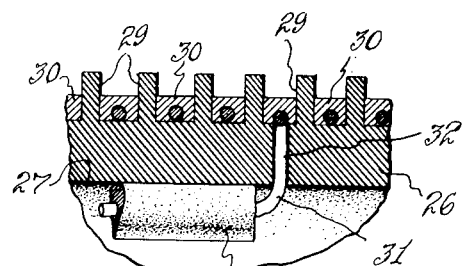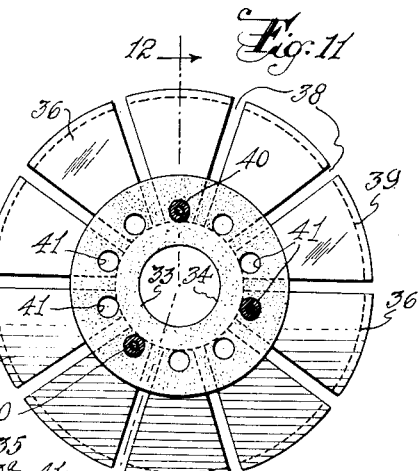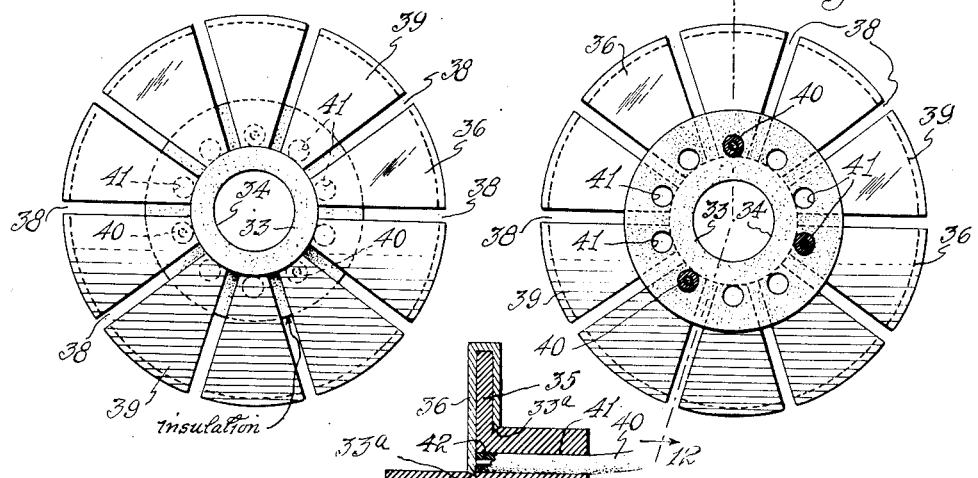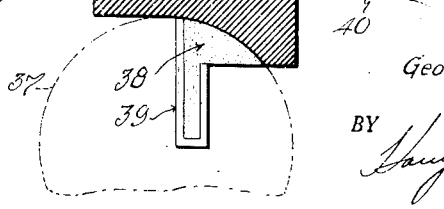

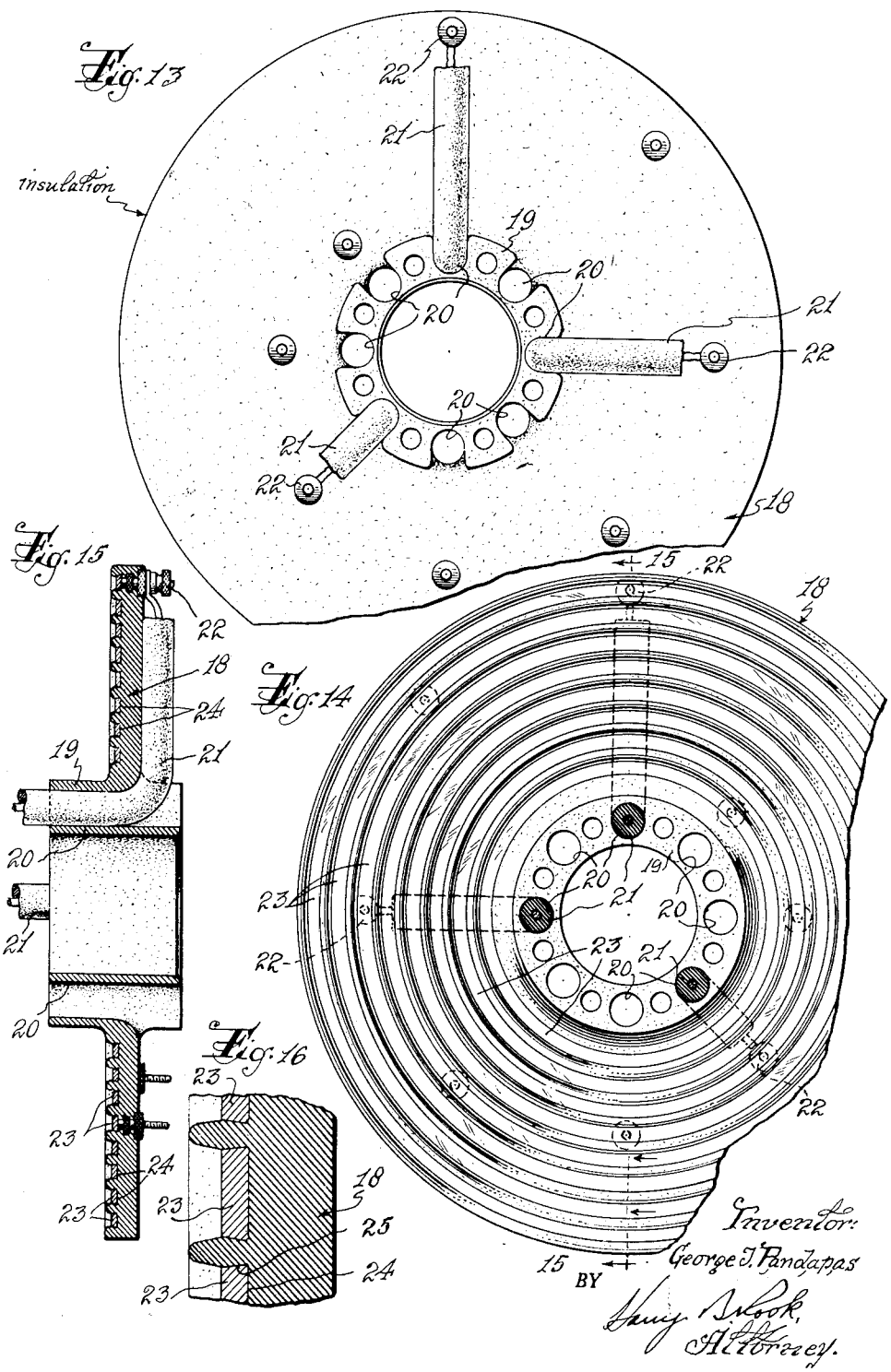

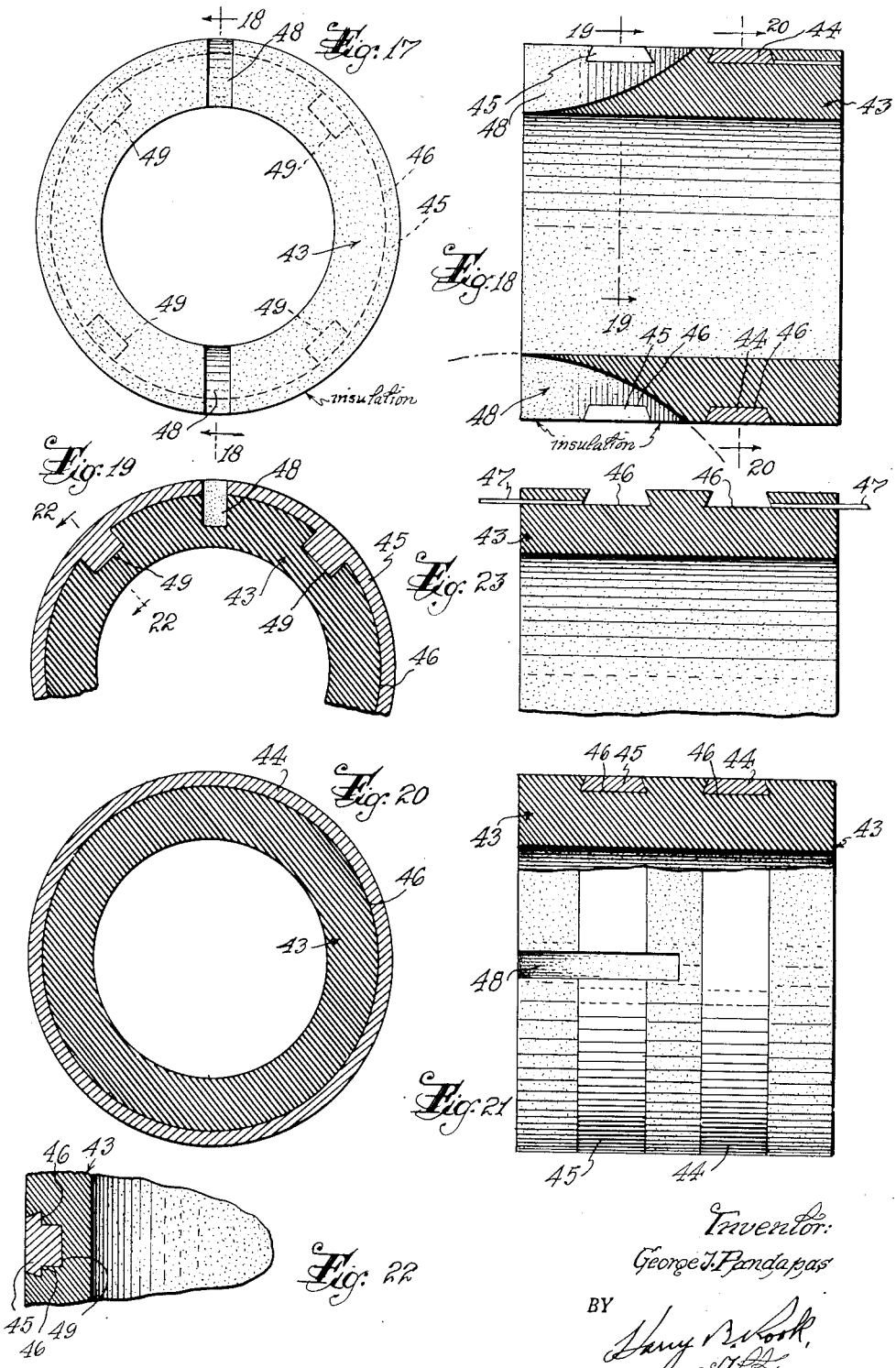

United States Patent Office 2,696,570
Patented Dec. 7, 1954

2,696,570

ELEMENT OF MECHANISM FOR CONDUCTING ELECTRICITY BETWEEN RELATIVELY MOVABLE STRUCTURES

George J. Pandapas, South Hackensack, N. J., assignor to Electro Tec Corp., South Hackensack, N. J., a corporation of New Jersey Application May 23, 1951, Serial No. 227,905

8 Claims. (Cl. 310—232)

This invention relates in general to mechanisms for conducting or transmitting electricity from one to the other of two relatively movable structures, and more particularly the invention contemplates improvements in elements of such mechanisms, especially elements of the nature of slip ring assemblies and commutators which comprise a body of electrical insulating or dielectric material having at least one electrical conductor such as a ring or plate thereon to frictionally electrically contact with, for example, a brush of another element of the mechanism.

The invention is especially directed to but not limited to the manufacture of miniature or small slip ring assemblies and commutators, and one object of the invention is to provide an element of the nature of a slip ring assembly or commutator which shall comprise a single rugged piece or unit wherein a plurality of conducting rings or plates can be firmly secured and accurately spaced on the body of insulation, and accumulated errors such as result from fabricating and assembling a plurality of separate parts shall be eliminated.

Most slip rings and commutators of this character include a dielectric body and one or more rings or plates thereon, each connected to one lead wire or to a terminal connector or binding post, and another object of the invention is to provide such a slip ring assembly or commutator which shall have the conductors secured on the body in a novel and improved manner to insure both firm attachment of the conductors to the body and perfect electrical connection between the conductors and the respective lead wires or binding posts.

A further object is to provide slip ring assemblies and commutators of such a construction that the conductors, for example rings or plates, shall be just thick enough to assume the wear of brushes or the like, thereby insuring economy in the use of metal which generally is a silver alloy.

Other objects are to provide a construction for and a method of making elements of the character described which shall enable such elements to be made strikingly smaller than has been practical heretofore and with substantially greater overall accuracy and efficiency than has been possible to obtain in known structures of this type; and to obtain other advantages and results that will be brought out by the following description in conjunction with the accompanying drawings in which Figure 1 is a side elevational view of one type of slip ring assembly embodying the invention;

Figure 2 is an end elevational view thereof from the plane of the line 2—2 of Figure 1;

Figure 3 is a greatly enlarged composite side elevational view and vertical longitudinal sectional view of the slip ring assembly illustrated in Figure 1, with portions broken away;

Figure 4 is a transverse vertical sectional view approximately on the plane of the line 4—4 of Figure 3;

Figure 5 is a similar view on the plane of the line 5—5 of Figure 3;

Figure 6 is a fragmentary vertical longitudinal sectional view through a modified form of slip ring assembly embodying the invention;

Figure 7 is a transverse vertical sectional view on the plane of the line 7—7 of Figure 6;

Figure 8 is a side elevational view of still another type of slip ring assembly constructed in accordance with the invention;

Figure 9 is a greatly enlarged fragmentary vertical longitudinal sectional view through the slip ring assembly shown in Figure 8 with some of the wires omitted for clearness in illustration;

Figure 10 is a top plan view of a commutator embodying the invention;

Figure 11 is a bottom plan view thereof;

Figure 12 is a vertical longitudinal sectional view approximately on the plane of the line 12—12 of Figure 11;

Figure 13 is a bottom plan view of another type of slip ring assembly constructed in accordance with the invention with portions broken away;

Figure 14 is a top plan view of the slip ring assembly shown in Figure 13 with portions broken away;

Figure 15 is a transverse vertical sectional view approximately on the plane of the line 15—15 of Figure 14;

Figure 16 is an enlarged fragmentary transverse sectional view on the plane of the line 16—16 of Figure 14;

Figure 17 is an end elevational view of another type of slip ring assembly that does not embody lead wires;

Figure 18 is a vertical longitudinal sectional view approximately on the plane of the line 18—18 of Figure 17;

Figure 19 is a fragmentary transverse sectional view on the plane of the line 19—19 of Figure 18;

Figure 20 is a transverse vertical sectional view on the plane of the line 20—20 of Figure 18;

Figure 21 is a top plan view, with portions broken away, of the slip ring assembly illustrated in Figure 17;

Figure 22 is a longitudinal vertical sectional view approximately on the plane of the line 22—22 of Figure 19; and Figure 23 is a fragmentary vertical longitudinal sectional view through the dielectric body showing it prepared for the electrodeposition of the conducting rings.

The invention is especially directed to the manufacture of miniature elements of the nature of slip ring assemblies and commutators for use in small electric motors, resolvers, computers, gyroscopes and precision instruments, but is equally useful in such elements of any size.

Referring first to the form of the invention illustrated in Figures 1 to 5 inclusive, this slip ring assembly includes a support wire 1, preferably corrosion resistant and possessing sufficient rigidity to provide adequate support for the contact wires 2 and a body of insulation 3, said support wire preferably having a thin coating of electrical insulation material. One or more lead or contact wires 2, depending upon the purpose for which the assembly is to be used, are preferably helically twisted around the support wire so that the lead wires may be firmly held on the support wires. The lead wires may be twisted throughout their lengths or the free end portions thereof may be untwisted and disposed parallel to the axis of the support wire as shown in the drawings; and if desired the wires may remain straight throughout their lengths and be secured to the support wire in some other suitable way. Each of the lead wires has a conducting core 4 and an insulating sheath or coating 5 and the free end portions of the wires are preferably disposed inwardly of the end of the support wire as best shown in Figure 3.

After the lead wires have been assembled on the support wire as described, a plastic body of insulating material is molded around all of the wires, preferably in a split mold so that the wires are entirely embedded within and covered by the molded body. Anyone of several thermosetting molding substances having electrical insulating properties may be utilized. After the molded body has been trimmed and cured in the usual way, it is lathe turned to the desired diameter to form a shoulder 6 where such is desired, after which a circumferential groove 7 for each lead wire is cut in the periphery of the body 3 at one side of the shoulder 6 of the width corresponding to that of the desired conducting ring and with its base close to but spaced from the lead wires 2. Then the molded insulating material at the bottom of each groove is cut away to expose the corresponding lead wire 2 and the insulating coating 5 on the wire is also cut away to expose the conducting core 4 as best shown in Figures 3 and 4.

Thereupon, a layer or coating of a liquid electrical conducting composition is applied on and throughout the area of the bottom surfaces only of the grooves 7, except that the exposed portions of the conductors 4 of the lead wires are not coated.

Then, a conducting ring 8 is electrodeposited or electroformed in each of the grooves 7, the whole assembly being mounted in an electroplating tank as the cathode and immersed in a suitable electrolyte between suitable anodes, depending upon the metal to be deposited. For example where a silver alloy is to be deposited, preferably a silver powder suspended in lacquer will be utilized as the conducting layers at the bottoms of the grooves 7, the electrolyte may be a silver cyanide solution and the anodes will be silver. The electrodeposit is allowed to build up until the layer is thick enough to permit machining of the rings without loosening thereof on the molded body. Thereafter the assembly is lathe turned to clean up the conducting rings 8 and to remove all portions of the deposits between the rings. Then the rings preferably are polished and may again be electroplated with metals to produce a desired surface characteristic, for example thin layers of platinum, rhodium or gold may be deposited on the silver conducting rings 8, for the purpose of reducing brush noises.

With this construction, it will be observed that the molded body 3, the conducting rings 8 and the lead wires 2 are integral or comprise one piece; that no fasteners are required and that all difficult and tedious individual handling and assembly of separate parts with the usual consequent inaccuracies, are obviated. It will also be noted that perfect electrical contact between the conducting or contact rings 8 and their respective lead wires is ensured, as shown in Figures 3 and 4, and the portions of the conducting rings 8 that are disposed in the cut away parts of the molded body and the insulation on the lead wires, provide keys, as indicated at 9, for interlocking or bonding the conducting rings with the body and wires so that rotation of the rings relatively to the insulating body and the lead wires is prevented. Moreover, the side walls of the grooves 7 effectually lock the rings against lateral movement lengthwise of the body, and the conducting rings may be of a thickness just sufficient to withstand brush wear so that the desired results can be achieved with a minimum of metal. The cutting of the grooves in the body insures accurate spacing of the conducting rings regardless of the size of the assembly, and large assemblies can be made with much smaller tolerances for inaccuracies than have been possible in slip ring assemblies made according to heretofore known methods. The elements made according to the invention possess greater overall accuracy and efficiency than any elements of the same general nature heretofore produced, and elements can be made in extremely small sizes that it was impossible to manufacture according to known structures and methods.

A modification of the invention is shown in Figures 6 and 7 where the body of insulation 10 is molded and the grooves 11 are cut in the molded body as hereinbefore described. However, the lead wires 12 are not molded into the body, but on the contrary after the body has been molded a hole 13 for each lead wire is bored in the body longitudinally thereof for each conducting ring 14, the length of the hole being such as to permit the end of the corresponding lead wire to be juxtaposed to the respective contact ring. In the bottom of each groove 11 a smaller hole 15 is formed through which the end portion of the conductor 16 of the corresponding lead wire is threaded and then wound around the body in contact with the base of the corresponding groove as indicated at 17 in Figure 7 to serve as a substitute for the conducting paint used in the form of the invention illustrated in Figures 1 to 5 inclusive.

The conducting rings 14 are electrodeposited in the grooves 11 in the same manner as the conducting rings 8. The two slip ring assemblies shown in Figures 1 to 7 inclusive are of the cylindrical type, but the invention may also be utilized in the slip ring assemblies of the flat type as shown in Figures 13 to 16 inclusive where the body of insulation 18 is in the form of a disc having a hub portion 19 in which there are holes 20 parallel to the axis of the disc through which the lead wires 21 are threaded so that they may be led into contact with the back side of the disc and have their end portions connected to suitable binding posts 22.

In the face of the body portion 18 are a plurality of conducting rings 23, one for each lead wire, each ring being electrodeposited or electroformed in a circular groove 24 whose side walls are preferably undercut as indicated at 25 and at the bottom of each of which is exposed one end of the corresponding binding post 22.

The conducting rings 23 are electrodeposited in the grooves 24 in the same general manner hereinbefore described, with each thereof in perfect electrical contact with the corresponding binding post. This form of the invention possesses all of the advantages in structure and operation that have been described in connection with the forms shown in Figures 1 to 6 inclusive.

Where a slip ring assembly of the larger type is to be made according to the invention, the formation of the dielectric body and the association of the contact wires therewith, are modified as shown in Figures 8 and 9. Here the body 26, which may be made in any suitable way, has a large central opening 27 therethrough in which all of the lead wires 28 are arranged in a bunched parallel relation as best shown at the left hand side of Figure 8. The body has a large number of grooves 29, for example thirty-six, each for a conducting ring 30, and one end of each of the lead wires 28 has the conductor 31 exposed and threaded through a hole 32 in the body 26 and then wrapped around the body in the same manner as the wires are wrapped around the body shown in Figures 6 and 7. The conducting rings 30 are electrodeposited according to the method hereinbefore described.

As above pointed out, the invention also may be embodied in commutators, one of which is shown in Figures 10 to 12 inclusive. Here a body of electrical insulating material 33 is formed in any suitable way, preferably by molding and has a central opening 34 to receive a shaft. A circumferential flange 35 projects from the body 34 in a plane perpendicular to the axis of the body, and a layer 36 of electrical conducting metal, such as a silver alloy, is deposited on both sides and the edge of said flange, after which the flange with said deposited layer is radially cut as by a saw 37 to form radial slots 38 which divide the flange into commutator segments 39. Each of these segments is electrically connected in the same manner hereinbefore described to a lead wire 40 which extends through an opening 41 parallel to the axis of the body 33 and has its conductor 42 directly electrically connected to the deposited layer 36 as best shown in Figure 12. Preferably, the electrodeposited layer is interlocked or bonded with the dielectric body 33, for example by forming undercut grooves 33a in the body into which the edges of the layer extend.

It will also be understood that instead of grooves the dielectric body hereinbefore described could be provided with undercut shoulders which provide the equivalents of grooves.

Another type of slip ring assembly is shown in Figures 17 to 23 inclusive. In this type of slip ring assembly, no lead wires are utilized, but the dielectric body 43 has a complete circumferential conducting ring 44 and two conducting segments 45, the ring 44 to contact one brush and the segments 45 to alternately contact another brush mounted in the other element of the mechanism of which the slip ring assembly forms a part.

In the manufacture of this type of assembly, the dielectric body 43 may be formed in any suitable manner, preferably by molding, and the circumferential grooves 46 are cut in the body for the respective conducting ring 44 and conducting segments 45. A wire 47 extends longitudinally from each end of the body through one side wall of the nearer groove 46, as best shown in Figure 23, for use during the electrodeposit of the conducting rings in the groves 46. Two comple rings are deposited in the grooves 46 according to the method hereinbefore described with the wires serving to conduct the electricity to the conducting paint on the bottoms of the grooves.

The rings and body are then cleaned up and two slots 48 are cut in the periphery of the body at one end to sever one of the rings into the two segments 45. To insure against circumferential slipping of the rings on the body, the body may be formed with recesses 49 into which portions of the electrodeposited rings extend as shown in Figures 19 and 22. This is particularly desirable in connection with the two segments 45. Disengagement of the ring and segments from the body 43 is prevented by the undercut side walls of the grooves 46, and the recesses 49 may be undercut also.

During the cleaning up operations on the unit, the projecting ends of the wires 47 are cut off as shown in Figure 18, and preferably one of the wires is entirely cut away by the formation of one of the slots 48.

It will be noted that the lead conductors and the electrodeposited conducting layers are integrally bonded together during the electrodeposition operation and thus each conducting layer and the lead conductor connected thereto constitute a conducting unit that is carried or supported by the dielectric body; and the conducting layer, lead conductor and the dielectric body constitute an element of mechanism for conducting electricity from one to the other of two relatively movable structures, wherein the electrodeposited conducting part or layer slidably frictionally engages a conducting part on the other structure.

While several embodiments of the invention have been illustrated and the method has been defined as involving certain steps in a certain sequence, it will be understood that this is primarily for the purpose of illustrating the now preferred embodiments of the invention and that the invention may be utilized in the manufacture of other types of slip ring assemblies, commutators and the like and that the steps of the method and sequence thereof may be modified, all within the spirit and scope of the invention.

I claim:

1. The method of making an element of a mechanism for conducting electricity between two relatively movable structures, said method comprising molding a body of electrical insulating material with a lead conductor molded therein, cutting a groove in a surface of said body, applying a coating of a conducting substance to the wall of said groove, cutting away a part of said body and a part of said coating at the wall of said groove to expose a portion of said conductor, and electrodepositing a layer of conducting material upon said coating in said groove and in direct electrical contact with said exposed portion of said conductor.

2. The method of making an element of a mechanism for conducting electricity between two relatively movable structures, said method comprising molding a cylindrical body of dielectric material with a plurality of lead wires molded therein in spaced side by side relation, cutting a groove in the periphery of said body for each lead wire, applying a coating of a conducting substance to the wall of each groove, cutting away the dielectric material and said coating at the bottom of each groove in juxtaposition to the corresponding wire to expose a portion of said wire, and electrodepositing a layer of electrical conducting material upon said coating in each groove and in direct electrical contact with said exposed portion of the corresponding lead wire.

3. An element of mechanism for conducting electricity from one to the other of two relatively movable structures each of which has a conducting part in sliding frictional contact with the conducting part of the other structure, said element comprising a dielectric body to be mounted on one of said structures and having a surface with a coating of a conducting substance thereon and also having an opening through said surface and through said coating, a lead conductor in said body and having a conducting portion extending into said opening, and a continuous layer of an electrical conducting material electrodeposited on said coating and directly on said conducting portion of said lead conductor and providing said conducting part electrically and physically bonded to said conducting portion of said lead conductor.

4. An element of mechanism for conducting electricity from one to the other of two relatively movable structures, said element having a conducting unit including a conducting part to slidably frictionally engage a conducting part of the other structure, said element comprising a cylindrical dielectric body having a longitudinal hole therethrough, said body also having a circumferential groove in its periphery and a coating of a conducting substance on the bottom wall of said groove, there being an opening extending from said hole through a wall of said groove and through said coating, a lead conductor in said hole and having a conducting portion extending into said opening, and a smooth layer of electrical conducting material electrodeposited in said groove with a portion thereof electrolytically bonded directly to said conducting portion of said lead conductor, said layer and said lead conductor constituting said conducting unit of said element.

5. The method of making an element having a conducting ring or plate with a smooth surface for sliding frictional contact with another conducting part, said method comprising forming a support body of dielectric material having a surface of a size and shape corresponding to the desired conducting ring or plate with an opening in said body extending through said surface and with a lead conductor in said body exposed through said opening, applying a coating of a conducting substance to said surface and leaving the exposed portion of said lead conductor uncoated and electrodepositing a layer of electrical conducting material on said coating and on said exposed lead conductor, thereby electrolytically and physically bonding said conducting layer to said lead conductor.

6. The method as defined in claim 5 wherein said lead conductor is exposed through said opening beneath said surface so that a portion of said conducting layer extends into and fills said opening.

7. An element of mechanism for conducting electricity between two relatively movable structures each of which has a conducting part in sliding frictional contact with the conducting part of the other structure, as defined in claim 4 wherein said lead conductor is spaced from said bottom wall of said groove and said portion of said layer of electrical conducting material extends into said opening to bond said layer to said body.

8. An element of mechanism for conducting electricity between two relatively movable structures each of which has a conducting part in sliding frictional contact with the conducting part of the other structure, said element comprising a support wire, a lead conductor having an insulating sheath mounted on and supported by said support wire, a cylindrical body of electrical insulating material moulded on said support wire and said lead conductor coaxially with said support wire and having a groove cut in the peripheral surface thereof, there being a coating of conducting material on a wall of said groove and there being an opening in said body through said wall of said groove and through said coating, said lead conductor having a conducting portion facing into said groove through said opening, and a layer of electrical conducting material electrodeposited in and throughout the circumference of said groove upon said coating and electrolytically and physically bonded directly to said conducting portion of the lead conductor.

References Cited in the file of this patent

UNITED STATES PATENTS

| Number | Name | Date |
| --- | --- | --- |
| 1,441,569 | Fischer | Jan. 9, 1923 |
| 1,455,028 | McCord | May 15, 1923 |
| 1,563,731 | Ducas | Dec. 1, 1925 |
| 1,870,236 | Chervenka | Aug. 9, 1932 |
| 2,051,663 | Werth | Aug. 18, 1936 |
| 2,297,488 | Luderitz | Sept. 29, 1942 |
| 2,316,652 | Moeller | Apr. 13, 1943 |
| 2,451,500 | LeGried | Oct. 19, 1948 |
| 2,478,536 | Koonz | Aug. 9, 1949 |

OTHER REFERENCES

Miscellaneous Publication 192, National Bureau of Standards, published November 22, 1948; sale by Supt. of Documents, U. S. Printing Office, Washington 25, D. C., pages 2, 36, 37, 39 and 40.

Neff, abstract of application Serial No. 659,781; published May 2, 1950, 634 O. G. 311.